(12) United States Patent
James

(10) Patent No.: US 12,071,991 B2
(45) Date of Patent: Aug. 27, 2024

(54) APPARATUS FOR SUPPORTING A HEAVY VEHICLE BRAKE ASSEMBLY

(71) Applicant: Workplace Maintenance Solutions Pty Ltd, Riddells Creek (AU)

(72) Inventor: Allan Martin James, Riddells Creek (AU)

(73) Assignee: Workplace Maintenance Solutions Pty Ltd, Riddells Creek (AU)

( * ) Notice: Subject to any disclaimer, the term of this patent is extended or adjusted under 35 U.S.C. 154(b) by 942 days.

(21) Appl. No.: 16/626,063

(22) PCT Filed: Jun. 29, 2018

(86) PCT No.: PCT/AU2018/050679
§ 371 (c)(1),
(2) Date: Dec. 23, 2019

(87) PCT Pub. No.: WO2019/000053
PCT Pub. Date: Jan. 3, 2019

(65) Prior Publication Data
US 2020/0217376 A1    Jul. 9, 2020

(30) Foreign Application Priority Data
Jun. 29, 2017    (AU) ................................ 2017902517

(51) Int. Cl.
     *B62B 3/04*      (2006.01)
     *B25B 11/02*      (2006.01)
     (Continued)

(52) U.S. Cl.
     CPC .......... *F16D 65/0043* (2013.01); *B25B 11/02* (2013.01); *B62B 3/02* (2013.01);
     (Continued)

(58) Field of Classification Search
CPC ..... F16D 65/0043; B62D 3/04; B62D 3/0618; B62D 3/104; B66F 5/04
See application file for complete search history.

(56) References Cited

U.S. PATENT DOCUMENTS

| | | | | |
|---|---|---|---|---|
| 5,127,638 A | * | 7/1992 | Kent | ......................... B66F 9/18 |
| | | | | 254/133 R |
| 5,378,004 A | * | 1/1995 | Gunlock | ................. B62B 1/002 |
| | | | | 414/427 |

(Continued)

FOREIGN PATENT DOCUMENTS

| | | |
|---|---|---|
| FR | 2988358 A1 | 9/2013 |
| FR | 2956852 B1 | 9/2014 |

(Continued)

OTHER PUBLICATIONS

International Application Serial No. PCT/AU2018/050679, Search Report and Written Opinion mailed Sep. 18, 2018.

(Continued)

*Primary Examiner* — Jeffrey J Restifo
(74) *Attorney, Agent, or Firm* — Polygon IP, LLP

(57) ABSTRACT

An apparatus configured to engage and support a heavy vehicle brake assembly to facilitate removal and installation. The apparatus comprises a drum and hub engagement assembly configured to engage an accessible portion of an in-situ drum and/or hub assembly and to support the drum and/or hub assembly when so engaged for transport between an in-situ position and a removed position. The apparatus includes a lifting assembly having an upright guide assembly and a lifting device for raising and lowering the drum and hub engagement assembly. The lifting device is configured to raise and lower the drum and hub engagement assembly and the drum and/or hub assembly engaged thereby along the upright guide assembly in a vertical line. The apparatus is configured to be positionable relative to the (Continued)

brake assembly and movable away from the vehicle to facilitate removal of the brake assembly.

13 Claims, 7 Drawing Sheets

(51) Int. Cl.
*B62B 3/02* (2006.01)
*B62B 3/10* (2006.01)
*B66F 9/06* (2006.01)
*F16D 65/00* (2006.01)

(52) U.S. Cl.
CPC ............... *B62B 3/04* (2013.01); *B62B 3/104* (2013.01); *B66F 9/06* (2013.01); *B62B 2202/02* (2013.01); *B62B 2203/10* (2013.01)

(56) References Cited

U.S. PATENT DOCUMENTS

| | | | | |
|---|---|---|---|---|
| 5,895,030 | A * | 4/1999 | Mohun | B60B 29/002 254/7 R |
| 6,237,206 | B1 * | 5/2001 | Bezemer | B60B 29/002 29/273 |
| 6,382,644 | B1 * | 5/2002 | Rawlings | B60B 29/002 414/427 |
| 9,771,990 | B2 * | 9/2017 | Slee | F16D 65/0043 |
| 10,076,931 | B2 * | 9/2018 | Finkbeiner | B66F 3/46 |
| 10,427,652 | B2 * | 10/2019 | Chirrey | B62B 3/104 |
| 10,746,240 | B2 * | 8/2020 | James | B25B 27/0035 |
| 11,267,087 | B2 * | 3/2022 | Thomas | B25H 1/0021 |
| 2005/0081355 | A1 * | 4/2005 | Nechvatal | B25B 11/02 29/239 |
| 2005/0254923 | A1 * | 11/2005 | Gorski | B62B 3/104 414/426 |
| 2008/0292434 | A1 * | 11/2008 | Wolterman | B62B 3/104 414/469 |
| 2009/0158570 | A1 * | 6/2009 | Morey | B66F 3/36 29/252 |
| 2015/0198208 | A1 * | 7/2015 | Mellberg | F16D 55/00 294/67.1 |
| 2015/0369309 | A1 * | 12/2015 | Slee | F16D 65/0043 269/17 |
| 2018/0126962 | A1 * | 5/2018 | Chirrey | B62D 7/18 |
| 2018/0180118 | A1 * | 6/2018 | James | F16D 65/0043 |
| 2018/0304867 | A1 * | 10/2018 | Chirrey | B62D 7/18 |
| 2020/0217376 | A1 * | 7/2020 | James | B66F 9/06 |
| 2020/0269641 | A1 * | 8/2020 | Edwards, Sr. | B60B 33/00 |

FOREIGN PATENT DOCUMENTS

| | | |
|---|---|---|
| WO | 2017000040 A1 | 1/2017 |
| WO | 2019000053 A1 | 1/2019 |

OTHER PUBLICATIONS

Australian Application Serial No. 2018293933, Office Action mailed Jan. 15, 2024, 3 pgs.
European Application Serial No. 18822869.6, Search Report mailed Dec. 8, 2021.

* cited by examiner

APPARATUS FOR SUPPORTING A HEAVY VEHICLE BRAKE ASSEMBLY

CROSS-REFERENCE TO RELATED APPLICATIONS

This application is the U.S. national phase of PCT Application No. PCT/AU2018/050679 filed on 29 Jun. 2018, which claims a priority to the Australian Provisional Patent Application No. 2017902517 filed on 29 Jun. 2017, both of which are incorporated herein by reference in their entirety and for all purposes.

TECHNICAL FIELD

The present disclosure relates to an apparatus for supporting a heavy vehicle brake assembly during a servicing procedure or the like.

BACKGROUND

Inspection, removal and servicing of a brake assembly for heavy vehicles can be difficult and time consuming due to the significant weight of the brake assembly. For example, a drum can weigh in excess of 65 kg and a hub assembly can weigh in excess of 50 kg. The general awkwardness and weight of the heavy brake assembly generally require multiple technicians working in concert to remove and reinstall the brake assembly piece by piece, a process that introduces health and safety concerns, is time-consuming, inconvenient and costly due to the manual labour required.

SUMMARY

According to a first aspect of the present disclosure, there is provided an apparatus for supporting a heavy vehicle brake assembly, the apparatus configured to engage and support the brake assembly to facilitate removal and installation, the apparatus comprising:

a drum and hub engagement assembly configured to engage an accessible portion of an in-situ drum and/or hub assembly and to support the drum and/or hub assembly when so engaged for transport between an in-situ position and a removed position facilitating removal and installation of the drum and/or hub assembly;

a lifting assembly having an upright guide assembly and a lifting device for raising and lowering the drum and hub engagement assembly, wherein the lifting device is configured to raise and lower the drum and hub engagement assembly and the drum and/or hub assembly engaged thereby along the upright guide assembly in a vertical line to facilitate servicing; and wherein the apparatus is configured to be positionable relative to the brake assembly and movable away from the vehicle to facilitate removal of the brake assembly.

According to an embodiment, the drum and hub engagement assembly, and the drum and/or hub assembly when so engaged, is configured to be rotatable to facilitate servicing.

According to a second aspect of the present disclosure, there is provided an apparatus for supporting a heavy vehicle brake assembly, configured to engage and support the brake assembly to facilitate removal and installation, the apparatus comprising:

a drum and hub engagement assembly configured to engage an accessible portion of an in-situ drum and/or hub assembly and to support the drum and/or hub assembly when so engaged for transport between an in-situ position and a removed position facilitating removal and installation of the drum and/or hub assembly, and wherein the apparatus is configured to be positionable relative to the brake assembly and movable away from the vehicle to facilitate removal of the brake assembly, and wherein, when the brake assembly is so removed, the drum and hub engagement assembly, and the drum and/or hub assembly when so engaged, is configured to be rotatable to facilitate servicing.

According to an embodiment, the apparatus further includes a lifting assembly having an upright guide assembly mounted to the apparatus and a lifting device for raising and lowering the drum and hub engagement assembly, wherein the lifting device is configured to raise and lower the drum and hub engagement assembly and the drum and/or hub assembly engaged thereby along the upright guide assembly in a vertical line to facilitate servicing.

According to an embodiment, the drum and hub engagement assembly, and the drum and/or hub assembly when so engaged, is rotatable from an operative position where the engaged drum and/or hub assembly has a longitudinal axis which is generally horizontal for removal and installation thereof to a transverse position wherein the axis is generally vertical.

According to an embodiment, the drum and hub engagement assembly, and the drum and/or hub assembly when so engaged, is rotatable from the operative position to the transverse position in either a clockwise or an anti-clockwise direction.

According to an embodiment, the lifting device comprises at least one linked foldable support member configured to be driven for movement in the vertical plane, an upper end of the support member(s) associated with the drum and hub engagement assembly and wherein the foldable support member(s) are extendable and retractable relative to the trolley to raise and lower the drum and hub engagement assembly in a vertical line guided by the upright guide assembly.

According to an embodiment, the drum and hub engagement assembly has a stud engagement member for engaging the hub assembly and a drum engagement assembly.

According to an embodiment, the trolley also has means for removing the hub assembly or drum and hub assembly from an axle from a vehicle.

According to an embodiment, the trolley has a pair of spaced apart feet configured to receive a further trolley therebetween.

According to a third aspect of the present invention, there is provided a system for removing and reinstalling a heavy vehicle brake assembly having a first trolley as described above, and a second trolley having a surface for assisting in replacement and/or servicing wherein the first trolley has a pair of spaced-apart feet configured to receive the second trolley therebetween.

According to an embodiment, the second trolley has means for raising and lowering the surface thereof.

According to an embodiment, the second trolley is configured to be positionable to be received between the feet of the first trolley and movable away from the first trolley to facilitate servicing and replacement.

According to a fourth aspect of the present invention, there is provided a method of removing a heavy vehicle brake assembly from a vehicle using the system as described above, comprising the steps of:

engaging the in-situ drum or hub assembly with the drum and hub engagement assembly of the first trolley;

removing the drum or hub assembly from the vehicle; and lifting or rotating the drum and hub engagement assembly to facilitate servicing.

According to an embodiment, the method further comprises the steps of:

positioning the second trolley such that it is received within the feet of the first trolley;

lowering the drum and hub engagement assembly and/or raising the second trolley surface such that the drum and/or hub assembly is received on the second trolley surface; and disengaging the drum or hub assembly from the drum and hub engagement assembly.

According to an embodiment, the drum and hub assembly are removed together.

According to an embodiment, the method further comprises the steps of:

rotating the drum and hub engagement assembly such that the drum and hub assembly is oriented so that the hub is at the upper end of the drum and hub assembly;

lowering the drum and hub engagement assembly and/or raising the second trolley surface such that the hub assembly is supported on the second trolley surface;

disengaging the hub from the drum and hub engagement assembly; and raising the drum and hub engagement assembly with the engaged drum such that the hub assembly is separated from the drum.

BRIEF DESCRIPTION OF DRAWINGS

Further aspects, features, implementations and advantages of the present disclosure may be appreciated from the following description of one or more embodiments thereof, presented by way of non-limiting example only and with reference to the accompanying drawings in which:

FIG. 9 is a view showing the apparatus supporting a hub assembly after it has been removed from the vehicle and FIG. 10 is a view showing the support trolley positioned to provide a work surface for servicing the hub assembly.

DETAILED DESCRIPTION

Figure 1A:
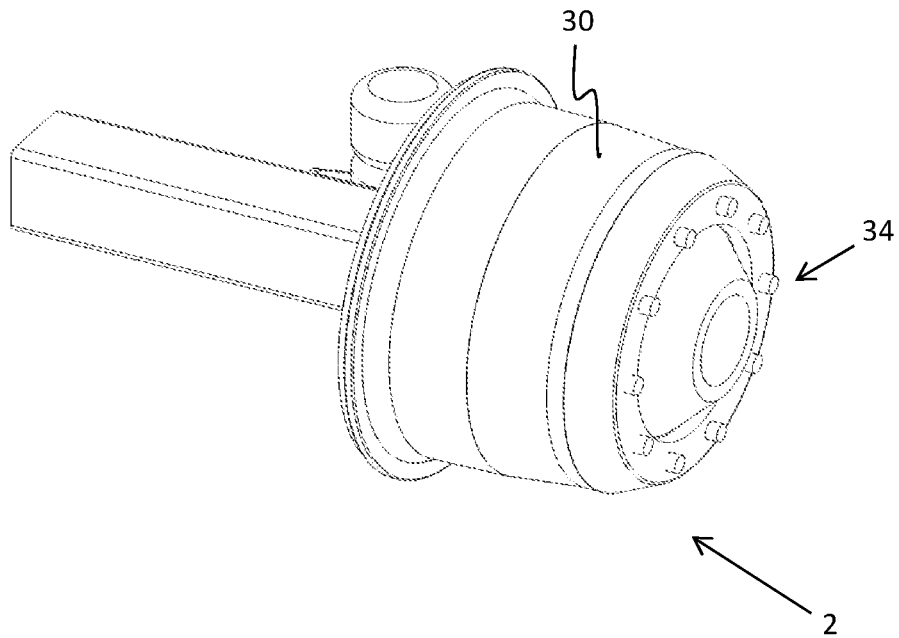
FIG. 1A is a perspective view of a heavy vehicle brake assembly.
Figure 1B:
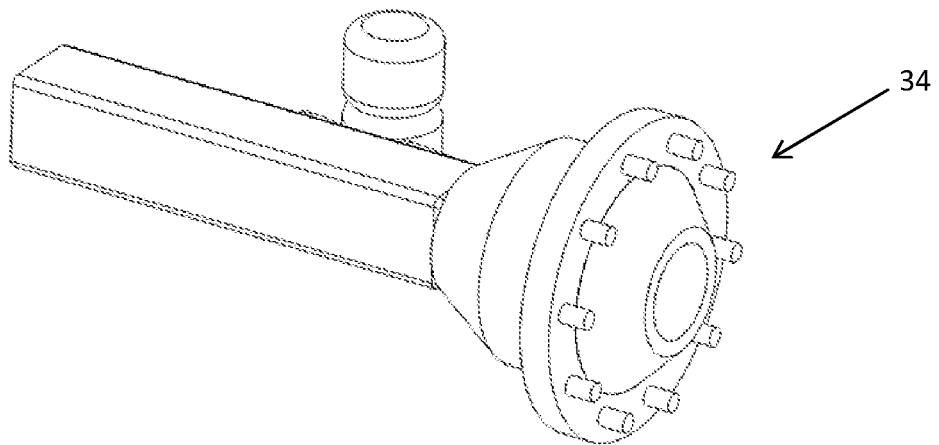
FIG. 1B is a perspective view of the heavy vehicle brake assembly with the drum removed.
Figure 2:
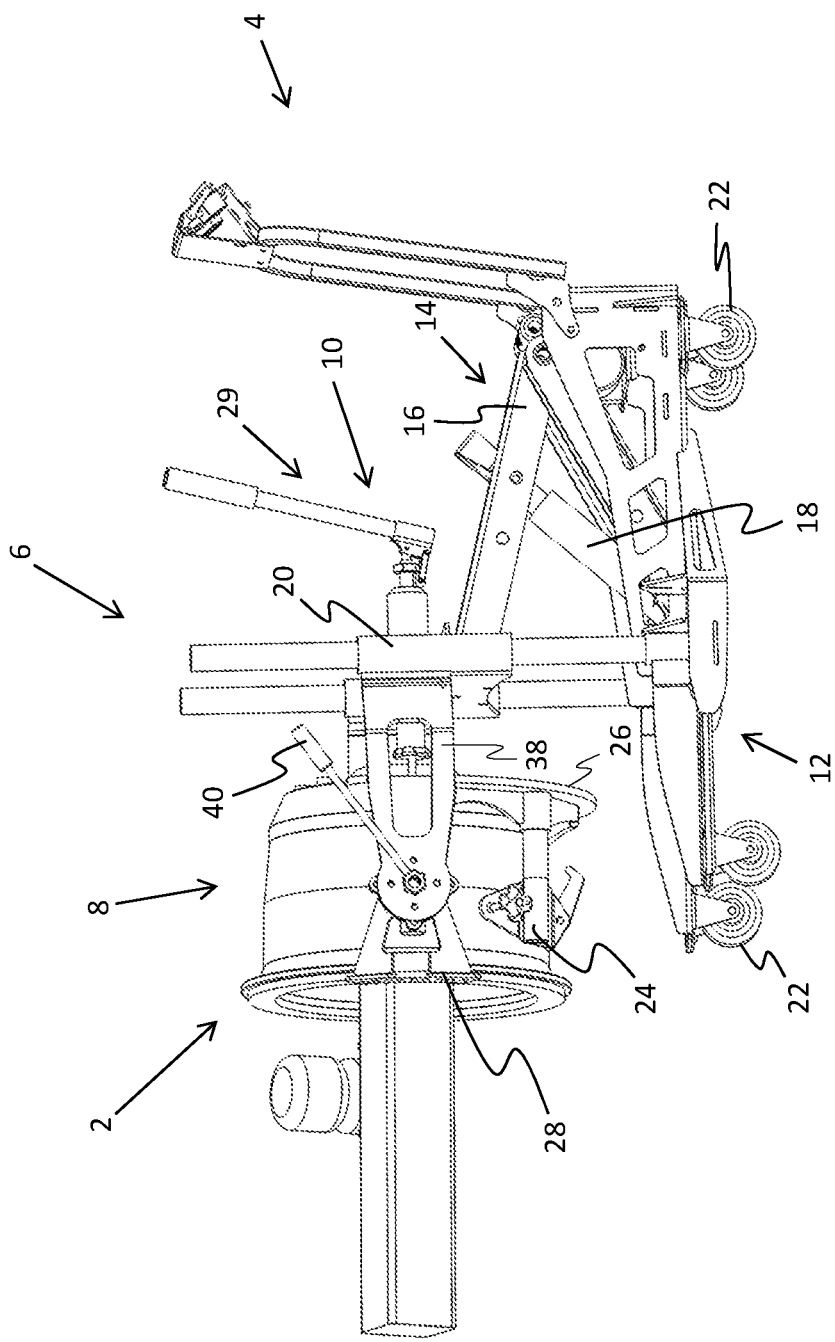
FIG. 2 is a perspective view of the brake assembly and an apparatus engaging the brake assembly according to some embodiments.

FIG. 1A shows a heavy vehicle brake assembly 2, in-situ on a vehicle, while FIG. 1B shows the heavy vehicle brake assembly with the drum 30 having been removed. FIG. 2 shows an apparatus 4 according to some embodiments, the apparatus 4 being configured for supporting the heavy vehicle brake assembly 2 to facilitate removal and installation. The apparatus 4 is configured to be positionable relative to the brake assembly and movable away from the vehicle to facilitate removal of the brake assembly, and is exemplified in the Figures as a service trolley.

The apparatus 4 has a drum and hub engagement assembly 6 configured to engage an accessible portion of an in-situ drum and hub assembly 8. The drum and hub engagement assembly 6 is configured to support the engaged drum and hub assembly 8 while it is being moved between an in-situ position and a removed position to facilitate removal and installation of the drum and hub assembly 8.

The apparatus 4 also has a lifting assembly 10 for raising and lowering the drum and hub engagement assembly 6, and the drum and hub assembly 8 if so engaged, to facilitate servicing. In the embodiment illustrated in the Figures, the lifting assembly 10 has an upright guide assembly 12 and a lifting device 14 which is guided to raise and lower the drum and hub engagement assembly 6, and drum and/or hub assembly 8 when so engaged, for movement in a vertical line by the upright guide assembly 12. The drum and hub engagement assembly 6 is pivotally attached to the lifting assembly 10 which is described further in the paragraphs below.

Thus the apparatus 4 advantageously allows for the easy and efficient engagement and removal of the heavy brake assembly 2 without requiring heavy lifting which reduces the risk of injury and also reduces the costs and time to remove and reinstall the heavy brake assembly 2.

Figure 3:
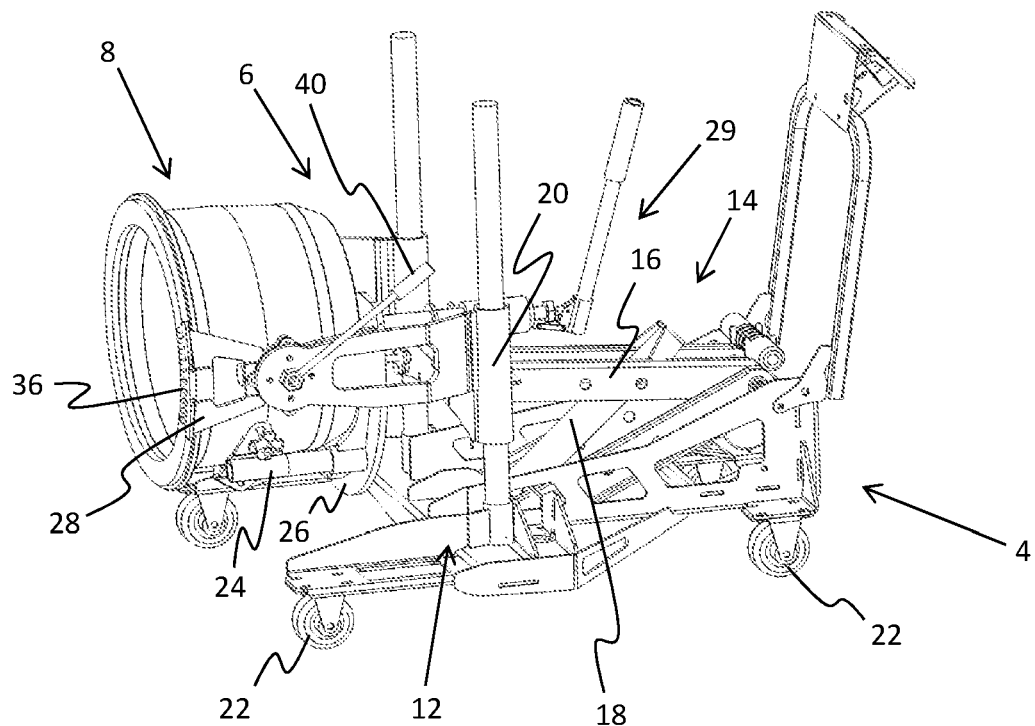
FIG. 3 is a perspective view of the apparatus positioned away from the vehicle with the brake assembly attached thereto.
Figure 4:
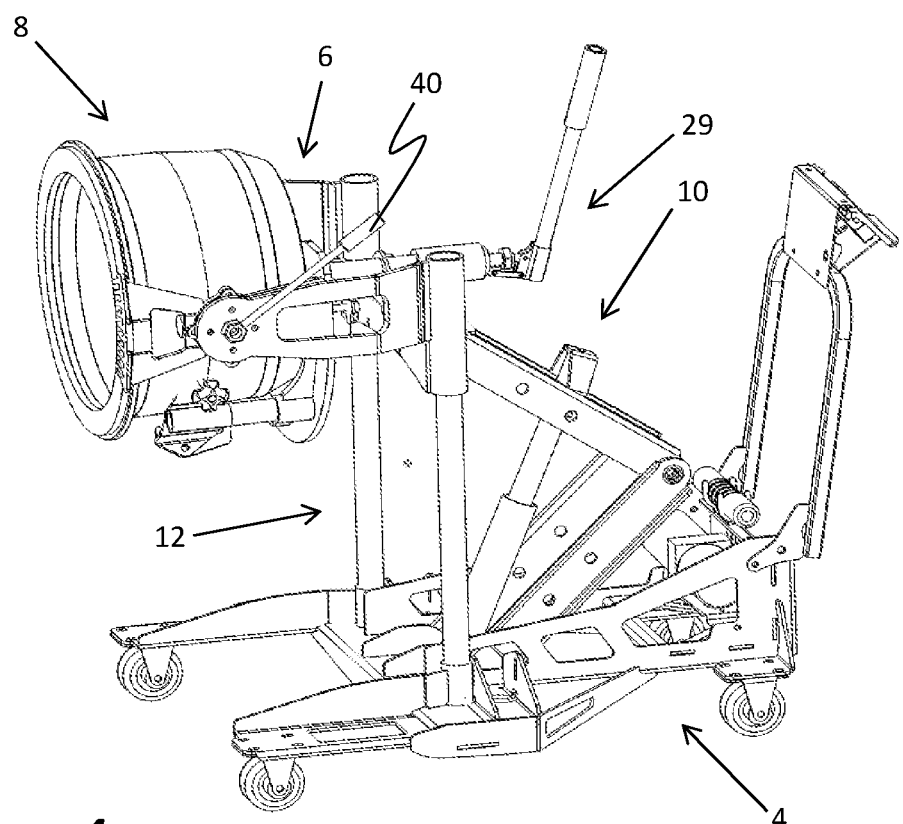
FIG. 4 is a perspective view of the apparatus in a raised configuration showing the brake assembly lifted in a position for service.

As illustrated in FIGS. 2 to 6, the lifting device 14 includes a pair of spaced apart linked foldable support members 16 where upper and lower end portions of the foldable support members 16 are pivotally attached respectively to the drum and hub engagement assembly 6 and the base of the apparatus 4. The foldable support members 16 are actuated by a hydraulically powered system 18 in the form of a hydraulic cylinder positioned therebetween effecting folding and unfolding of the linked foldable support members 16 to raise and lower the drum and hub engagement assembly 6 and thus the engaged drum and hub assembly 8, as illustrated in FIGS. 3 and 4.

In the examples shown in the Figures, the lifting assembly 10 has a pair of upwardly directed sleeves 20, and the guide assembly 12 is in the form of a pair of upright spaced apart shafts extending from the base of the apparatus 4. The upright shafts of the guide assembly are slidably received in the respective sleeves 20 allowing the drum and hub engagement assembly 6 to be guided by the guide assembly 12 in a vertical line when raised and lowered by the lifting device 14.

FIG. 2 shows the apparatus 4 positioned near the heavy vehicle brake assembly 2 and the drum and hub engagement assembly 6 which has been brought into engagement with the in-situ drum and hub assembly 8. The base of the apparatus 4 comprises a chassis having rollers 22 in the form of swivel castors arranged such that the apparatus 4 is positionable relative to the brake assembly 2 for engagement thereof and movable away from the vehicle to facilitate removal or replacement of the brake assembly 2.

In the example shown in FIGS. 3 and 4, once the brake assembly 2 has been removed from the vehicle, the lifting device 14 can be operated to raise the drum and hub assembly 8 to an appropriate level to facilitate servicing by a technician. It can be appreciated that the lifting device 14 is capable of lifting the drum and hub assembly 8 through a range of heights to allow the apparatus 4 to be used by different service technicians for different purposes.

Figure 9:
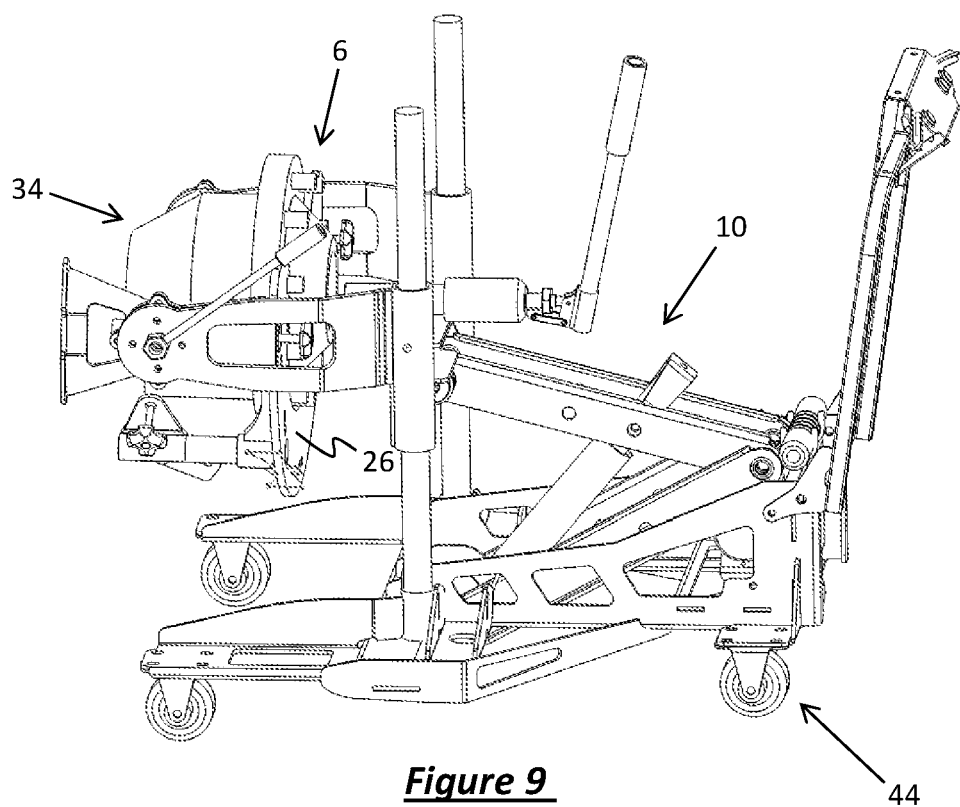
FIGS. 9 and 10 are perspective views of the system in use, in particular
Figure 10:
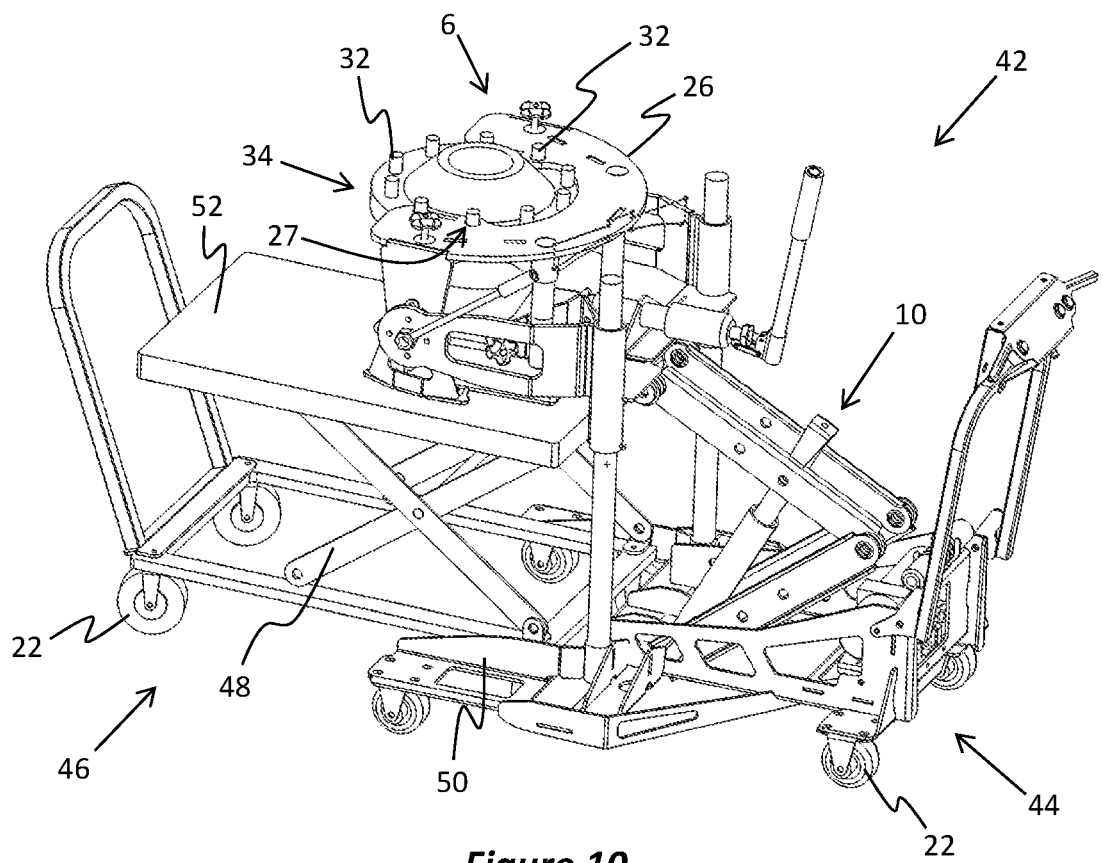

As illustrated in FIGS. 2 to 6, the drum and hub engagement assembly 6 includes a support cradle 24 for cradling the bell of the drum 30, a stud engagement member 26 for engaging the wheel studs 32 of the hub assembly 34 and a pair of spaced apart clamping members 28 for clamping the drum and hub assembly 8 to the stud engagement member 26. The stud engagement member 26 can be configured to engage to two or four wheel studs 32 to engage the brake assembly 2. The stud engagement member 26 as exemplified in FIGS. 9 and 10 is in the form of a plate which has slots or apertures 27 in which the wheel studs 32 can be received. To secure the hub assembly 34 to the engagement member 26, wheel nuts (not shown) may be applied to the wheel studs 32.

The spaced apart clamping members 28 extend transverse from opposing sides of the stud engagement member 26 so as to receive the drum and hub assembly 8 therebetween. The clamping members 28 are extendable and contractable relative to the stud engagement member 26 and have inwardly directed flanges 36 at each end thereof which are configured to engage an end portion of the drum and hub assembly 8 such that the drum and hub assembly 8 is clamped between the stud engagement member 26 and flanges 36. It can be appreciated that the clamping members 28 are extendable and retractable to allow the securing of differently shaped and sized drums or drum and hub assemblies between the flanges and the stud engagement member.

If the drum and hub engagement assembly 6 is to engage only the drum 30, it can be understood that the drum 30 would be engaged by the clamping members 28 such that the drum 30 is secured between the flanges 36 and stud engagement member 26. Alternatively, if only the hub assembly 34 is engaged by the drum and hub engagement assembly 6, the hub assembly 34 may be secured to the stud engagement member 26 by wheel nuts as described above.

Once the brake assembly 2 is brought into engagement with the drum and hub engagement assembly 6, the apparatus 4 can be moved away from the vehicle, as illustrated in FIGS. 2 and 3. To remove the brake assembly 2 from the vehicle, mechanical assistance may be required, for example in the form of a five-ton hydraulic press 29 which is integrated into the apparatus 4 as illustrated in the Figures. However it can be appreciated that the mechanical assistance may take other forms such as pneumatic or electrically-powered systems which can be similarly integrated into the apparatus 4 or provided separately.

The drum and hub engagement assembly 6 is pivotably attached to the lifting assembly 10, and with the drum and/or hub assembly 8 secured thereto allows inspection and replacement of bearings (not shown). The drum and hub engagement assembly 6 is rotatable from an operative position where the engaged drum and/or hub assembly 8 has a longitudinal axis which is generally horizontal forwards and backwards to a transverse position such that the longitudinal axis of the drum and/or hub assembly is generally vertical allowing inspection, servicing, or replacement of the bearings therein from either end.

Figure 5:
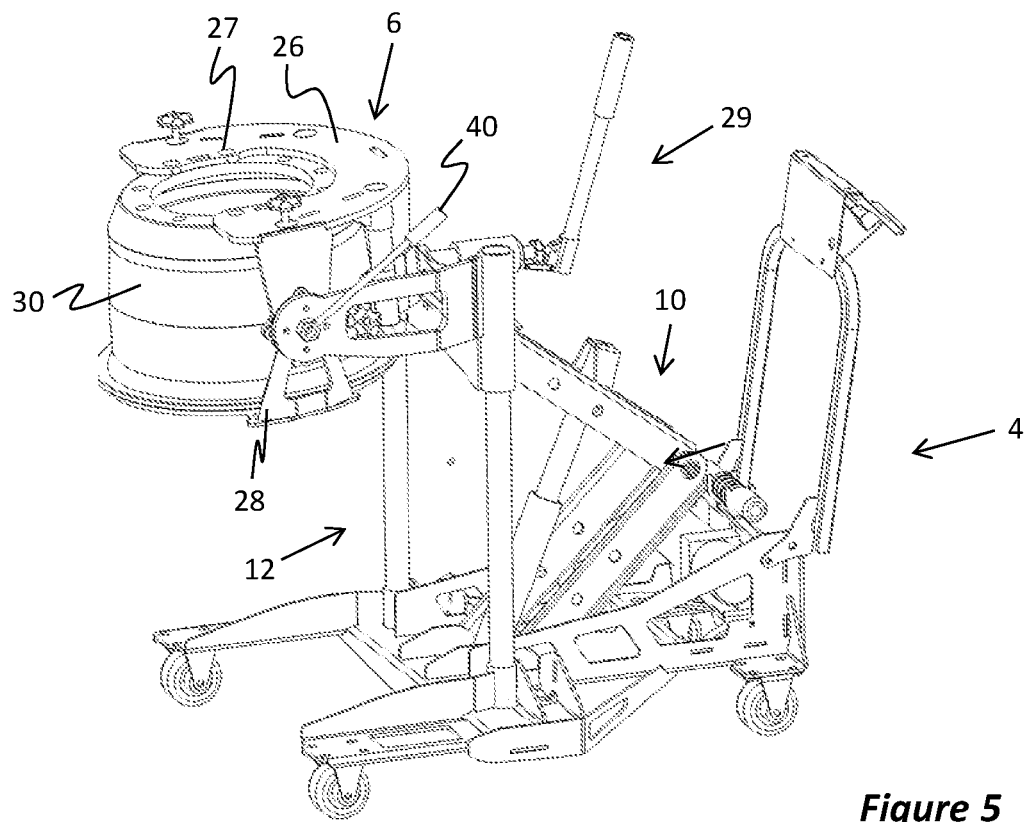
FIG. 5 is a perspective view of the apparatus with the brake assembly rotated into a first position for service.
Figure 6:
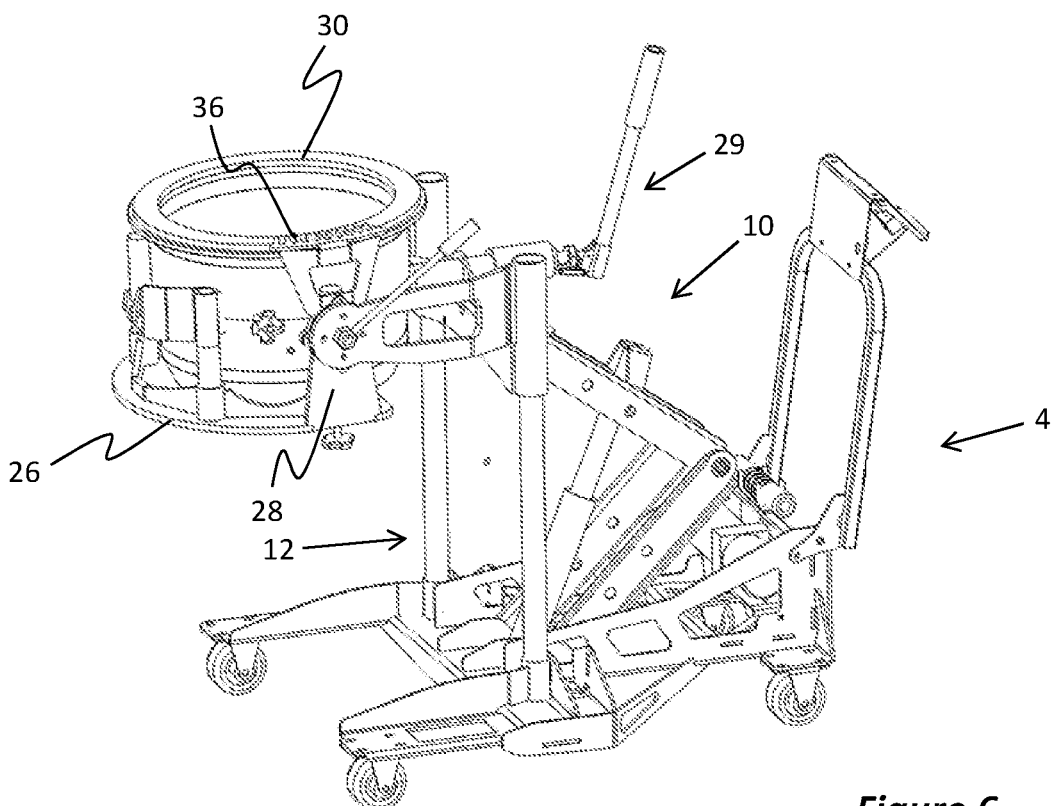
FIG. 6 is a perspective view of the apparatus with the brake assembly rotated into a second position for service.

FIG. 5 illustrates that the drum and hub engagement assembly 6 and engaged drum 30 is by rotated 90° forwards such that the longitudinal axis is rotated from the operative position to the transverse position, while FIG. 6 illustrates that the that the drum and hub engagement assembly 6 and engaged drum 30 is rotated 90° backwards such that the longitudinal axis is rotated from the operative position to a further transverse position. It can be appreciated that while FIGS. 5 and 6 illustrate an example where only the drum 30 is engaged, the apparatus 4 can obviously be used with both the drum and hub assembly 8 engaged.

Alternatively, as illustrated in FIGS. 9 and 10, only the in-situ hub assembly 34 may be engaged to the stud engagement member 26 and removed from the vehicle, and thus the stud engagement member 26 with the hub assembly 34 so engaged can be raised or lowered or rotated in a similar manner as described above for servicing.

The lifting assembly 10 has a pair of arms 38, each arm 38 being pivotally attached at one end to a clamping member 28 of the drum and hub engagement assembly 6 while the opposing end of each arm 38 is connected to the lifting device 14, as illustrated in the Figures. In addition, the pivotal attachment can be in the form of a friction hinge such that the drum and hub assembly 8 does not rotate unless force is applied by a service technician. A handle 40, as exemplified in the Figures, can be provided for ease of handling to rotate the drum and hub assembly 8. The handle 40 can be also be provided with a locking mechanism (not shown) to secure the drum and hub assembly 8 in a desired orientation.

FIGS. 7 to 10 illustrates a system 42 according to some embodiments including an apparatus as described above in the form of a service trolley 44 along with a support trolley 46 which can be used to facilitate servicing and/or replacement of the hub assembly and/or drum 30. The support trolley 46 may be provided with a lifting device 48 such that the surface 52 of the support trolley 46 can be raised or lowered to an appropriate level to facilitate servicing by a technician. The lifting device 48 is exemplified in FIGS. 7 to 10 as a scissor lift mechanism, however it will be appreciated that other forms of lifting devices could be utilized. Alternatively, the support trolley 46 may not have a lifting device.

Figure 7:
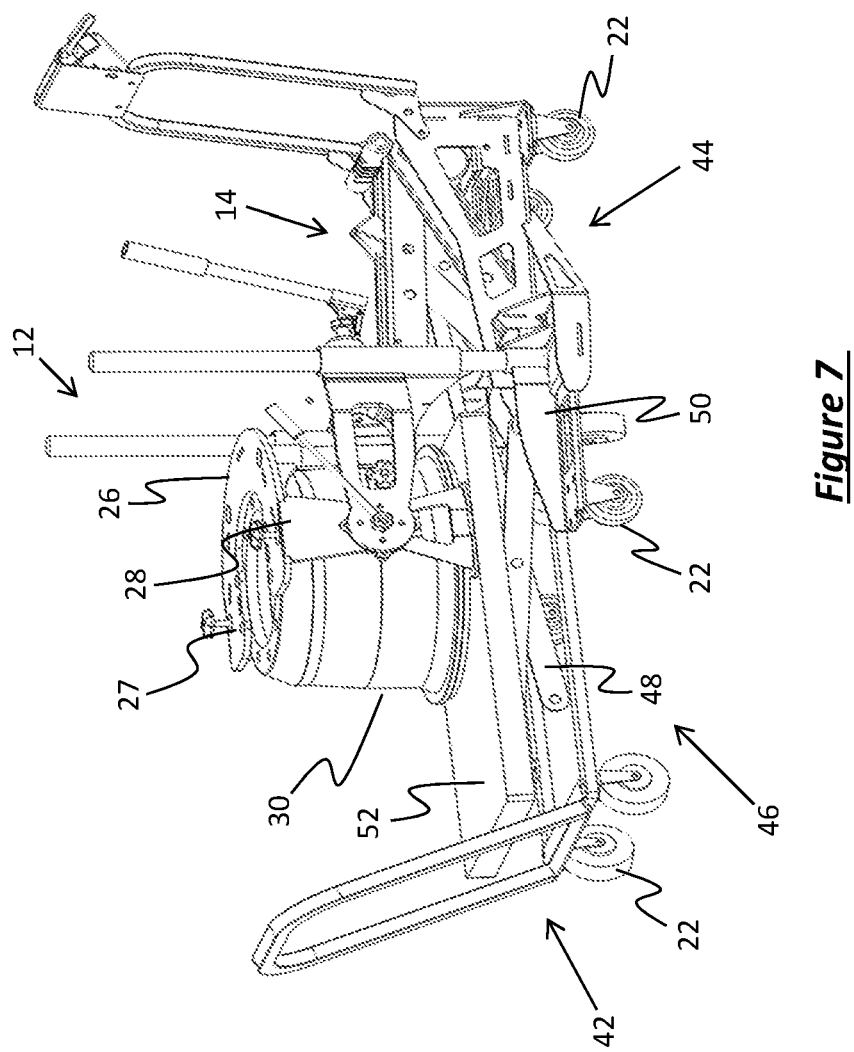
FIG. 7 is a perspective view of a system including a support trolley where the brake assembly is lowered onto the support trolley according to some embodiments.
Figure 8:
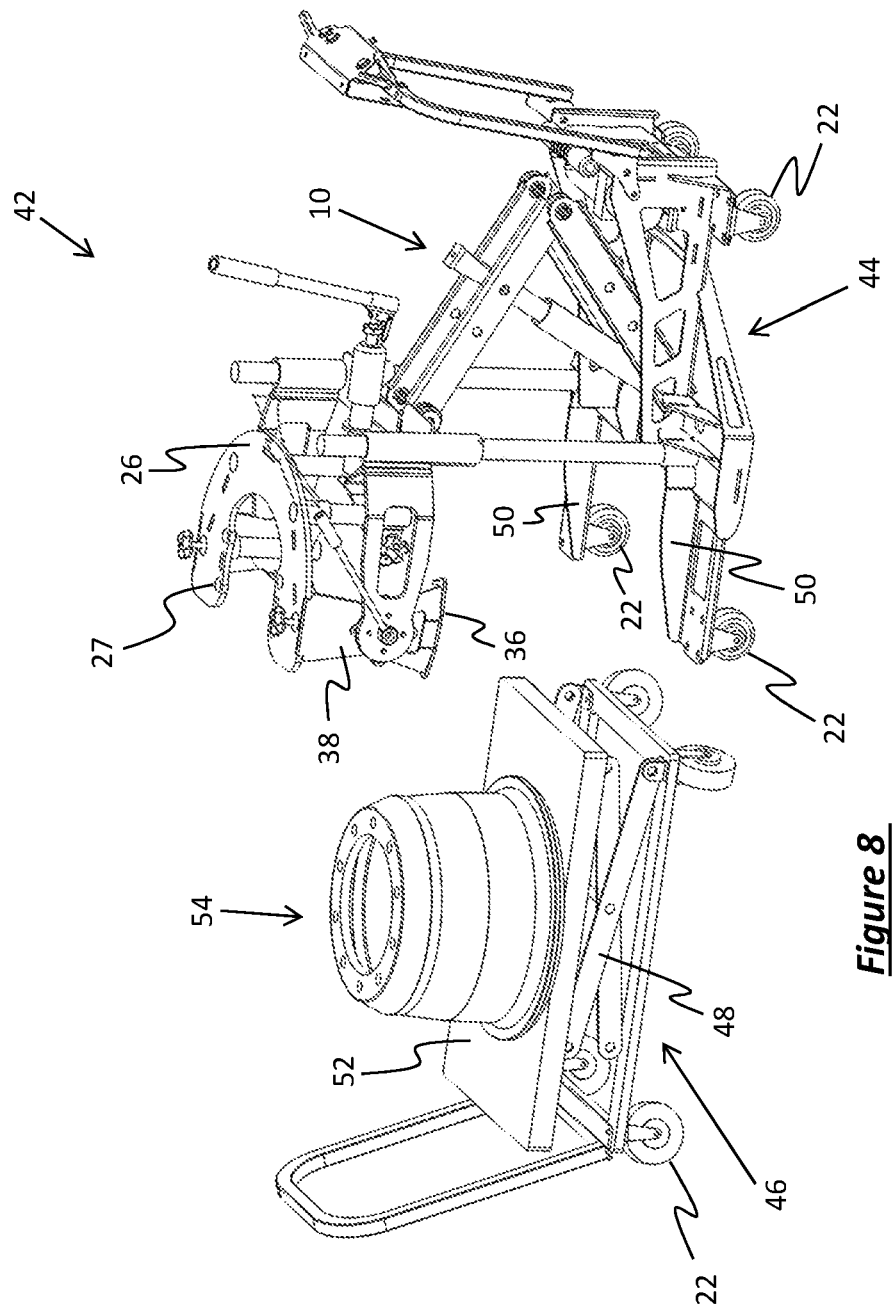
FIG. 8 is a perspective view of the system of FIG. 7 showing a new brake assembly on the support trolley ready for installation.

The service trolley 44 has a pair of spaced apart feet 50, the support trolley 46 being receivable between the feet 50 such that the drum 30, as illustrated in FIGS. 7, 8 and 10, can be lowered by the lifting assembly 14, onto the support trolley surface 52 and disengaged from the drum and hub engagement assembly 6. Alternatively, the support trolley surface 52 can be raised to meet the drum 30. Once the previous drum 30 has been removed, the support trolley 46 with the replacement drum 54 thereon is positionable between the feet 50 of the service trolley 44 and the process reversed to engage and support the replacement drum 54 and reassemble the brake assembly 2 on the vehicle.

End portions of each foot 50 of the service trolley 44 are provided with one of the four rollers 22 thereby ensuring that the weight of the drum and hub assembly 8 when so engaged by the service trolley 44 is stable and evenly balanced.

Although only two trolleys 44, 46 are illustrated in the Figures, it can be appreciated that two or more service or support trolleys 44, 46 could be used to remove and reinstall the brake assembly 2 and to serve as work surfaces, such as during replacement of the bearings, such as illustrated in FIG. 9.

In an example method of use of the system 42, the service trolley 44 is positioned such that the stud engagement member 26 abuts the outer end of the in-situ drum 30 and the support cradle 24 supports the weight of the drum 30. Then the clamping members 28 are engaged to the other end of the drum 30 such that the drum 30 is clamped between the flanges 36 of the clamping members 28 and stud engagement member 26 thereby securing the drum 30 to the drum and hub engagement assembly 6. The hub assembly 34 can be secured to the stud engagement member 26 by applying wheel nuts (not shown) to the wheel studs 32 of the hub assembly 34.

The service trolley 44 can then be positioned to remove the drum and hub assembly 8 from the vehicle for servicing or replacement. In particular, the drum and hub assembly 8 can be raised or lowered by operating the lifting assembly 14 to a convenient height for inspection and/or servicing by a technician. Furthermore, the drum and hub assembly 8 can be rotated for easy access to inspect the interior thereof. Thus advantageously the drum and hub assembly 8 can be engaged and removed by the service trolley 44 in a single step reducing the need to lift heavy equipment, time and costs to service the brake assembly and increasing the safety to the technicians.

If replacing the drum and hub assembly 8, the service and support trolleys 44, 46 can be positioned such that the support trolley 46 is received within the feet 50 of the service trolley 44. Then the drum and hub assembly 8 can be positioned onto the support trolley by lowering the drum and hub engagement assembly 6 or raising the support trolley surface 52, and then disengaging the drum and hub assembly 8 from the drum and hub engagement assembly 6. It can be appreciated that instead of removing the drum and hub assembly 8 together, the drum 30 can first be removed from the vehicle by the service trolley 44 and placed onto the support trolley 46 before the service trolley 44 is then used to engage and remove the hub assembly 34.

In another example use of the system, the service and support trolleys 44, 46 can also be used to separate the hub assembly 34 from the drum 30 at a removed position from the vehicle. First, the drum and hub engagement assembly 6 can be rotated such that axis of the drum 30 is vertically oriented with the hub assembly 34 at the upper end thereof, a support block can be placed on the support trolley 46, which is positioned such that it is received within the feet 50 of the service trolley 44. The drum and hub assembly 8 can then be lowered onto support trolley 46 until the weight of the hub assembly 34 is supported by the support block.

By removing the wheel nuts (not shown) attaching the hub assembly 34 to the stud engagement member 26 the hub assembly 34 disengages from the drum 30 while the drum 30 is still engaged by the clamping members 26. When the drum and hub engagement assembly 6 is raised, the engaged drum 30 is also raised leaving the hub assembly 34 supported on the support trolley 46. Thus the drum and hub assembly 8 can be separated in an easy and efficient way at a position removed from the vehicle, which is made possible by the ability of the service trolley 44 to raise and lower the drum and hub engagement assembly 6 in a vertical line.

Once the drum and hub assembly 8 has been inspected and serviced, they can be reassembled using a method which is generally the reverse of the disassembly procedure discussed above. It can be appreciated that the method described above is a mere example, and that the service trolley and/or support trolley 44, 46 can be used in a variety of ways to facilitate removal and servicing of the heavy brake assembly.

While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. An apparatus for supporting a heavy vehicle brake assembly comprising a drum and hub assembly, the apparatus configured to engage and support the brake assembly to facilitate removal and installation, the apparatus comprising:
  a drum and hub engagement assembly configured to engage an accessible portion of an insitu drum and/or hub assembly and to support the drum and/or hub assembly when so engaged for transport between an in-situ position and a removed position facilitating removal and installation of the drum and/or hub assembly, and
  wherein the apparatus is configured to be positionable relative to the brake assembly and movable away from the vehicle to facilitate removal of the brake assembly, and wherein, when the brake assembly is so removed, the drum and hub engagement assembly, and the drum and/or hub assembly when so engaged, is configured to be rotatable to facilitate service,
  wherein the drum and hub engagement assembly, and the drum and/or hub assembly when so engaged, is rotatable from an operative position where the drum and hub engagement assembly has a longitudinal axis which is generally horizontal for removal and installation thereof to a transverse position wherein the axis is generally vertical.

2. An apparatus according to claim 1, further including a lifting assembly having an upright guide assembly mounted to the apparatus and a lifting device for raising and lowering the drum and hub engagement assembly, wherein the lifting device is configured to raise and lower the drum and hub engagement assembly and the drum and/or hub assembly engaged thereby along the upright guide assembly in a vertical line to facilitate servicing of the drum and/or hub assembly.

3. An apparatus according to claim 2, wherein the lifting device comprises at least one linked foldable support member configured to be driven for movement in a vertical plane, an upper end of the support member(s) associated with the drum and hub engagement assembly and wherein the foldable support member(s) are extendable and retractable relative to the apparatus to raise and lower the drum and hub engagement assembly in the vertical line guided by the upright guide assembly.

4. An apparatus according to claim 1, wherein the drum and hub engagement assembly, and the drum and/or hub assembly when so engaged, is rotatable from the operative position to the transverse position in either a clockwise or an anti-clockwise direction.

5. An apparatus according to claim 1, wherein the drum and hub engagement assembly has a stud engagement member for engaging the hub assembly and a drum engagement assembly.

6. An apparatus according to claim 1, further having means for removing the drum and hub assembly from an axle from a vehicle.

7. An apparatus according to claim 1, having a pair of spaced apart feet configured to receive a trolley there between.

8. A system for removing and reinstalling a heavy vehicle brake assembly having an apparatus according to claim 3, and a trolley having a surface for assisting in replacement and/or servicing wherein the apparatus has a pair of spaced-apart feet configured to receive the trolley there between.

9. A system according to claim 8, wherein, the trolley has means for raising and lowering the surface thereof.

10. A system according to claim 8, wherein the trolley is configured to be positionable to be received between the feet of the apparatus and movable away from the apparatus to facilitate servicing and replacement.

11. An apparatus of claim 1, wherein the drum and hub assembly is rotatable into the transverse position such that an opening of the drum is orientated substantially upwardly so as to facilitate easy access to inspect an interior disposed within the opening of the drum.

12. An apparatus of claim 1, wherein the apparatus includes a friction hinge for preventing rotation of the drum and hub engagement assembly unless force is applied by a user of the apparatus.

13. An apparatus of claim 1, wherein the apparatus includes a locking mechanism for securing rotation of the drum and hub engagement assembly in a desired orientation.

* * * * *